United States Patent
Peckham

(10) Patent No.: US 6,209,320 B1
(45) Date of Patent: Apr. 3, 2001

(54) VARIABLE TORQUE CONVERTER

(75) Inventor: David Ronald Peckham, Gillitts (ZA)

(73) Assignee: 2001 Transmission Inc., Guernsey (GB)

( * ) Notice: Subject to any disclaimer, the term of this patent is extended or adjusted under 35 U.S.C. 154(b) by 0 days.

(21) Appl. No.: 09/226,109

(22) Filed: Jan. 7, 1999

(30) Foreign Application Priority Data

Jan. 10, 1998 (ZA) .................................................. 97/6125

(51) Int. Cl.⁷ .................................................. F16D 33/00
(52) U.S. Cl. .................................................. 60/330; 60/363
(58) Field of Search ............................ 60/330, 366, 357

(56) References Cited

U.S. PATENT DOCUMENTS 3,948,048 * 4/1976 Lifka ...................................... 60/330
4,391,096 * 7/1983 Polzer et al. ........................... 60/335

* cited by examiner

*Primary Examiner*—Edward K. Look
*Assistant Examiner*—Thomas E. Lazo
(74) *Attorney, Agent, or Firm*—Young & Thompson

(57) ABSTRACT

A stepless continuously variable transmission system has a casing with inlet (or outlet) holes, the casing housing an inlet and output shaft which are connected by series of concentric cages, alternate cages being connected to the inlet and outlet shafts alternately whilst remaining free to rotate on the other shaft respectively. The cages include series of blades which interact with a transmission medium which is moved in a direction or directions in the casing between inlet and outlet so that the blades experience changes in angular momentum of the transmission medium, the blades being curbed oppositely in relation to whether their cage is an inlet or outlet connected cage.

4 Claims, 3 Drawing Sheets

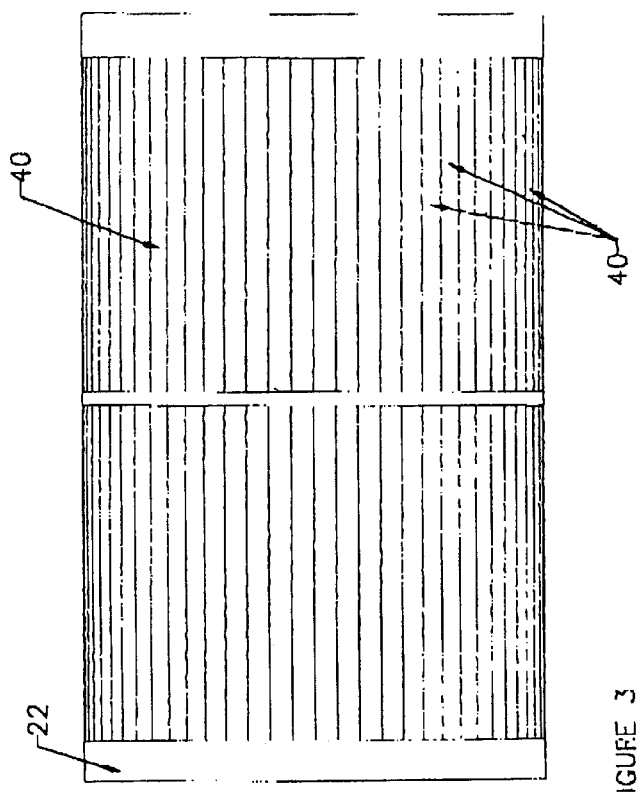
FIGURE 3
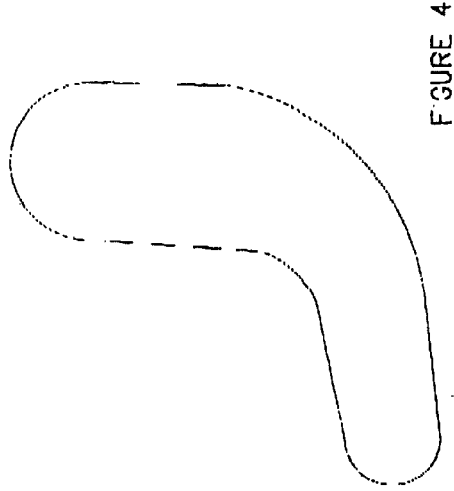
FIGURE 4
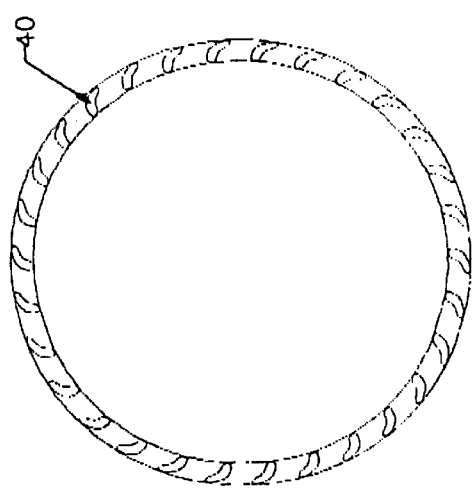

VARIABLE TORQUE CONVERTER

FIELD OF THE INVENTION

This invention relates to a stepless countinuously variable transmission system.

BACKGROUND OF THE INVENTION

U.S. Pat. No. 3,948,048 (Lifka) relates to a fluid drive which has a three coaxial cylinders, the outer of which is fixed to an output shaft and the inner to an input shaft. The intermediate cylindrical member has vanes on either side for interaction with vanes on the outer and inner cylinders. The action is described basically in lines 52 to 62 of column 2 of the specification and may be shortly described as follows: rotation of the input shaft 24 causes rotation of cylinder 12, its vanes 29 cause the fluid in space 42 to rotate and, its vanes 25 then cause the cylinder 14 to rotate.

The fluid is trapped in the casing and the rotational forces cause frictional action or viscous drag on the vanes thus imparting the desired rotation.

In the present invention, the inefficiency of this type of action is recognized and reliance is placed on hydrodynamic principles involving changes in angular momentum, which allow for more efficient transfer of forces. The fluid is not trapped in the spaces between successive cylinders but rather is given an inwardly or outwardly directed motion so that the desired changes in angular momentum are realized.

U K Patent 607 4365 (Lombardini) is a similar arrangement to that of Lifka if one dissociates oneself with the clutch portion of the arrangement. In essence this invention is a combination of clutch and fluid transmission, the object being to maintain efficiency of the transmission on slipping of the clutch. In FIG. 2 of the Lombardini patent an arrangement very similar to that of Lifka is shown in so far as concentric sets of vanes are provided to "throw out the transmission fluid into the adjacent set of oppositely inclined vanes" from inside to outside (or vice versa). There are three sets of vanes for the driving member and two for the driven member.

U.S. Pat. No. 1,428,586 (Garrison) also provides an annular fluid channel with series of annular blades for frictional transmission of power from the driving to the driven shaft.

Swiss patent 86251 may appear at first glance to involve all angular impingement action by virtue of the provision of an inlet (g) and an outlet (h) for the fluid. However, it is clear that these are merely for the drainage of fluid and refilling purposes. Reference to FIG. 1 will show that the action is similar to all of the above inventions i.e. that of viscous drag, the fluid of these prior inventions moving with the shafts and their vanes and not, as in the stepless transmission system of the present invention, interacting with concentric cages allowing for the required changes in angular momentum.

SUMMARY OF THE INVENTION

According to the invention a stepless countinuously variable transmission system including a casing which houses an input and an output shaft that are connected by a series of concentric cages, some of the cages being fixed to the output shaft and some to the input shaft whilst remaining free to rotate on the other shafts respectively; the cages comprising or including series of blades adapted to interact with a transmission medium which is moved in a predetermined direction or directions in the casing between an inlet and an outlet, whereby the blades experience the changes in angular momentum of the transmission medium.

In one form of the invention the cages alternate between being rigidly attached to the input and output shafts and act in pairs and assuming for the sake of illustration that the outer cage of a pair is driven by an input shaft, the inner cage would then drive the output shaft.

As the fluid passes through an arbitrary individual couple, the outer cage increases the angular momentum of the fluid. The energy imparted to the fluid by this change in angular momentum is then extracted from the fluid by the inner cage of that couple. Considering the flow of an infinitesimal small portion of fluid through the drive, it is evident that the energy extracted from the particle of fluid can be increased by increasing the number of couples or stages thereof. The final output power is the sum of the power extracted from the fluid by the inner cages of the individual stages.

The stepless transmission system of the invention is capable of extracting more work per unit mass of fluid than existing fluid couplings or torque converters. In existing fluid couplings and torque converters, a unit mass of fluid experiences just one reversal in angular momentum, consequently any residual angular momentum of the fluid is not utilized unless additional extraction devices are incorporated. The coupled cage system of the present invention allows for more reversals of angular momentum in proportion to the number of stages used.

For maximum power transmission it has been found that the system should operate in a completely drowned state i.e. all cages should be interacting with the fluid at all times during the transmission of power.

The transmission of power can be controlled by suitable control of the fluid flow through the transmission system.

Where the cages alternate as regards their relative location, either input or output related, the curvature of the blades are opposite in sense. The curvature of the blades can be defined by two angles (inlet and outlet) that are determined according to the required changes in angular momentum of the fluid.

BRIEF DESCRIPTION OF THE DRAWINGS

Embodiments of the invention are described below with reference to the accompanying drawings in which:

FIG. 3 is a diagrammatic representation of a cage carrying blades; and

FIG. 4 shows a typical blade profile, being a sectional view through three adjacent cages.

DESCRIPTION OF THE PREFERRED EMBODIMENTS

Figure 1:
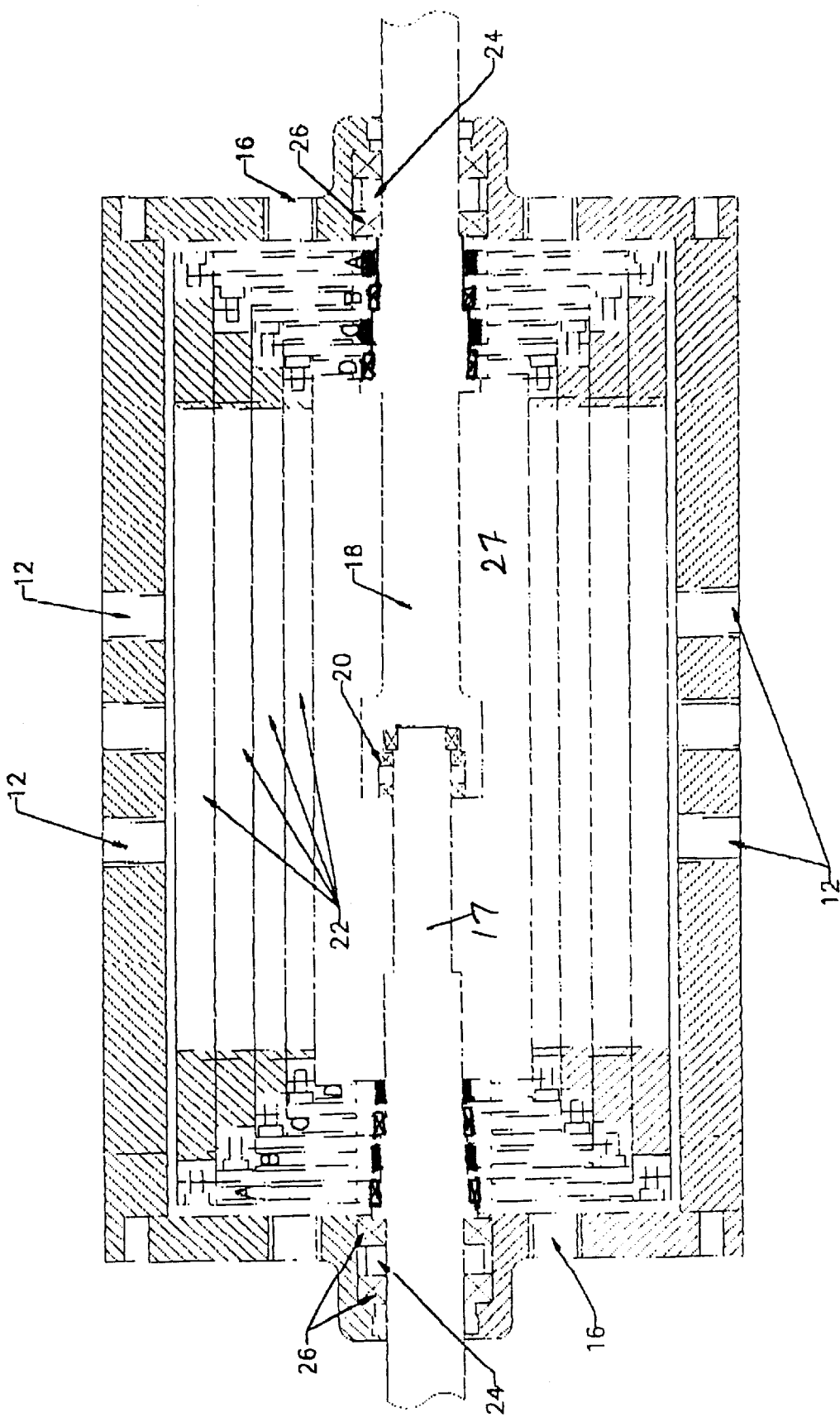
FIG. 1 is a sectional side view through an arrangement according to the invention.

In FIG. 1, a casing 10 includes a plurality of inlet holes 12 for free flow of fluid. The casing end plates also accommodate two shafts 18 and 17 one of which is a driven shaft and the other a driving shaft These shafts are free to move relatively to one another by means of bearings 20.

It will be appreciated that the holes 12 may be outlets and holes 16 inlets depending on the desired direction of transfer of drive through the arrangement to outlet holes 16 in end plates 14 of the casing.

Four cages 22 constituting two stages are concentrically arranged around the shaft and these are alternately splined (24) and journalled (26) to the shafts.

Thus, if the left hand shaft 17 is the driving shaft, it will rotate and cause the first and third (from the right hand side)

cages to rotate and establish angular momentum of the fluid. The fluid in the casing which is introduced through the holes 12 flows radially through the cages to the centre zone 27, enhancing the angular momentum and causing the second and fourth cages to rotate and thereby impart a rotation to the driven shaft (right hand shaft 18) through its splines. The fluid is forced out of the casing end plates through holes 16. It will be appreciated that the flow pattern will depend on several parameters relative to the size and/or application of the transmission.

Figure 2:
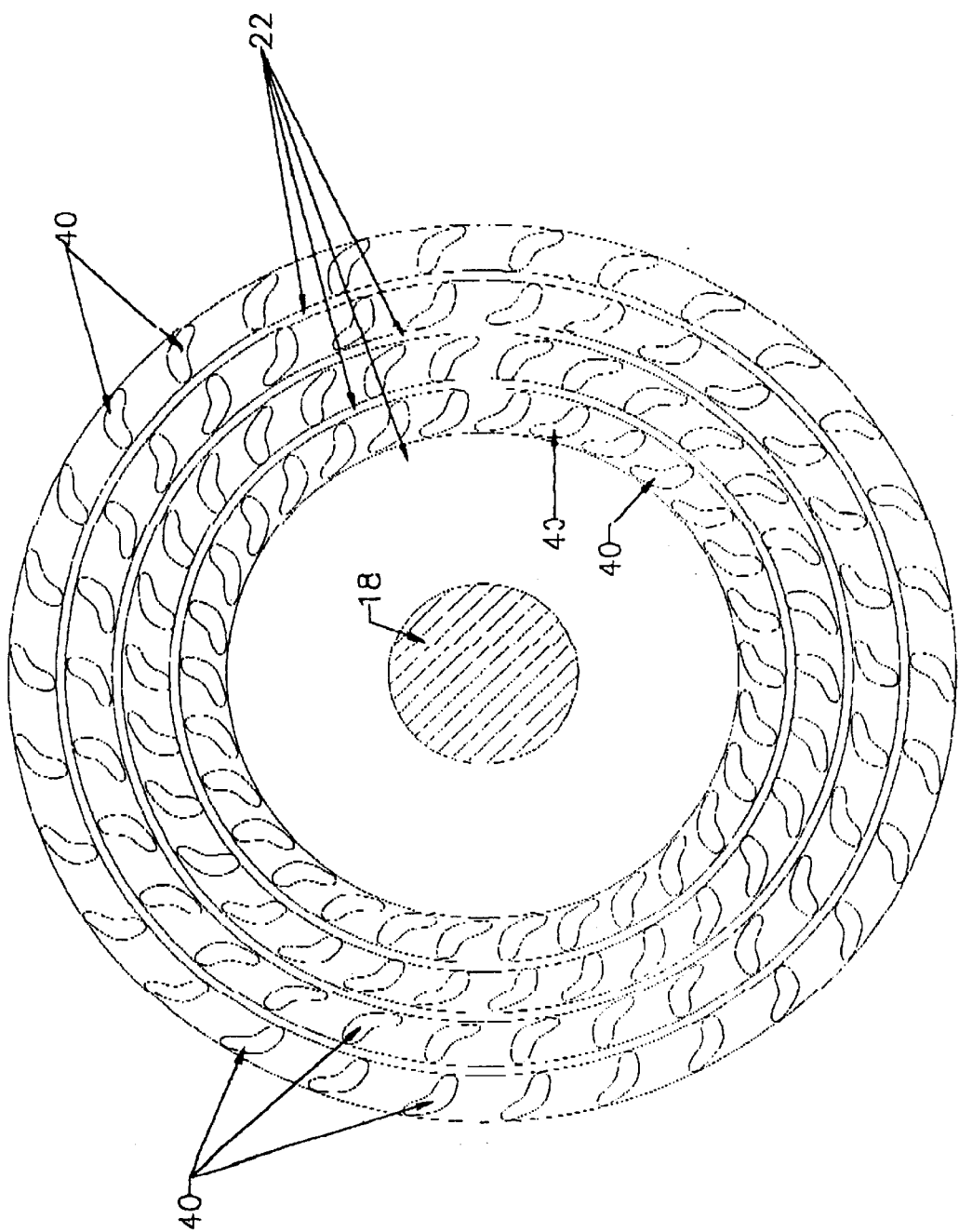
FIG. 2 is a transverse sectional view of FIG. 1.

FIGS. 2 and 3 illustrates the arrangement of the blades 40 mounted on end structures 22. It will be appreciated that the shaft 18 may be solid or hollow. The angle of the blades can be calculated to achieve maximum power transfer but will vary depending on size or application. Having regard to FIG. 4, one particular shape is shown and the angle of 15° indicated. It will of course, be appreciated that for different applications this angle may vary as well as the particular shape.

What is claimed is:

1. A stepless continuously variable transmission system comprising:

a series of concentric cages;

an input shaft;

an output shaft operatively connected to the input shaft by the series of concentric cages; and a casing housing the input shaft and the output shaft and having a transmission medium inlet and a transmission medium outlet, some of the cages being fixed to the output shaft and being free to rotate on the input shaft, others of the cages being fixed to the input shaft and being free to rotate on the output shaft, the cages comprising a series of blades adapted to interact with a transmission medium moved in a predetermined direction within the casing between the transmission medium inlet and the transmission medium outlet, wherein an angular momentum of the transmission medium imparts a thrust on the blades of the cages fixed to the output shaft, and the angular momentum of the transmission medium relieves a pressure formed in a central zone of the system by moving the transmission medium in the central zone to the transmission medium outlet.

2. The system according to claim 1 in which the cages alternate between being rigidly attached to the input and output shafts and act in pairs.

3. The system according to claim 1 in which the curvature of the blades of the cages fixed to the input shaft are of opposite in sense to those fixed to the output shaft.

4. The system according claim 1 in which the casing includes a plurality of inlet holes for free flow of fluid, the end plates of the casing accommodating the two shafts and outlet holes.

* * * * *